June 21, 1927.
W. STUMPF
1,633,389
ELECTRIC TOOL
Filed March 15, 1926    2 Sheets-Sheet 1
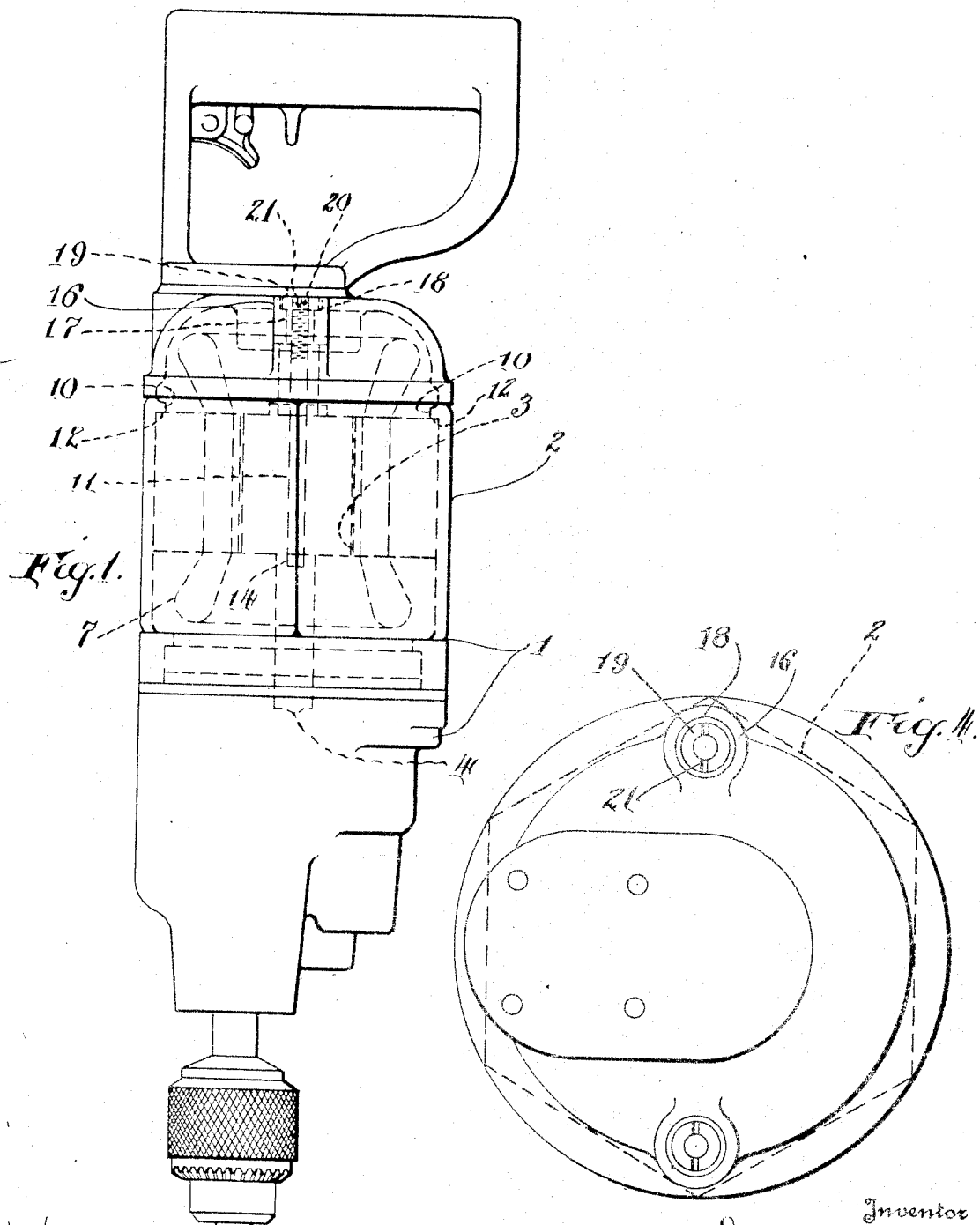

June 21, 1927.                    W. STUMPF                    1,633,389
                                ELECTRIC TOOL
                          Filed March 15, 1926         2 Sheets-Sheet 2
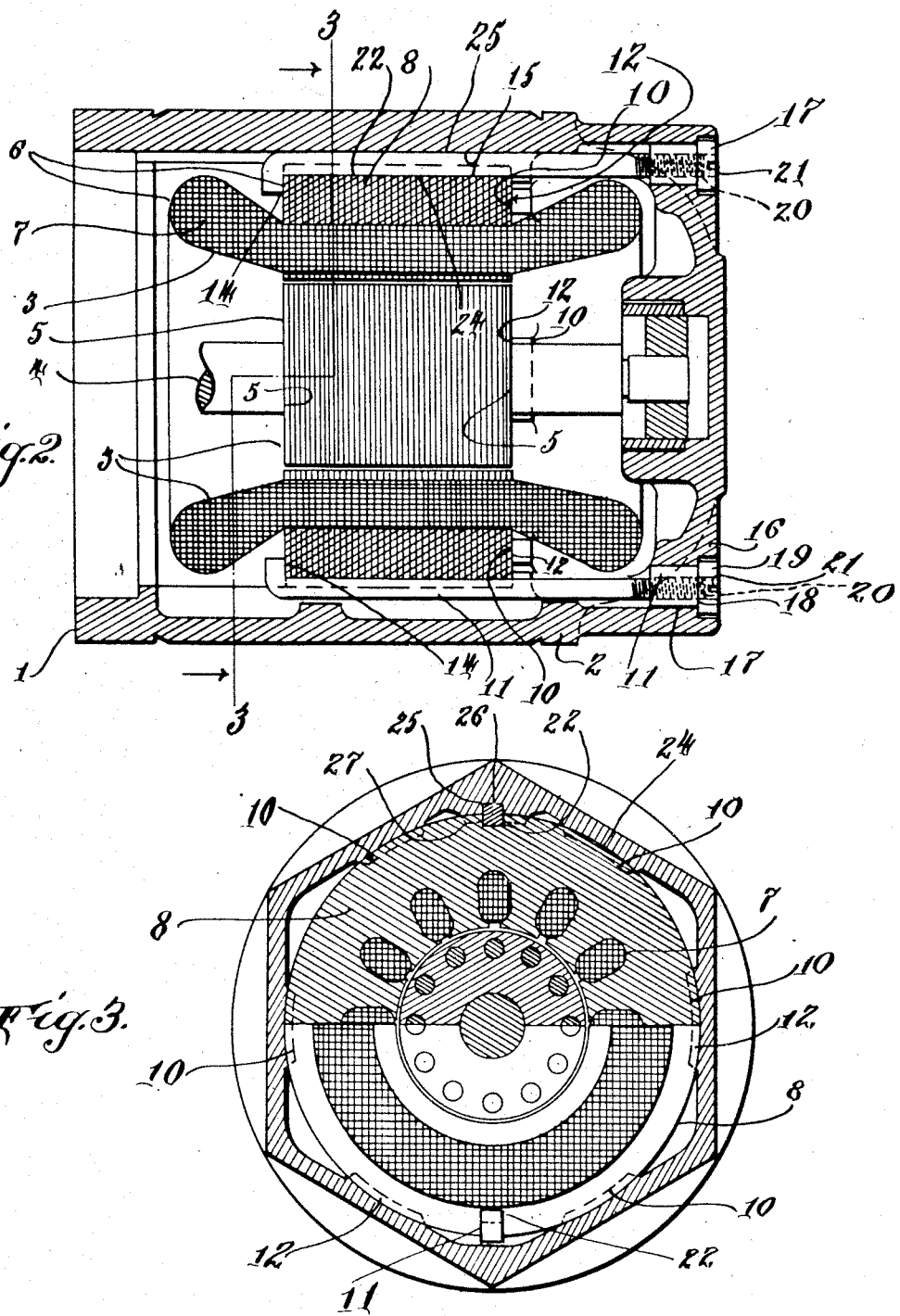

Patented June 21, 1927.

1,633,389

UNITED STATES PATENT OFFICE.

WALTER STUMPF, OF BALTIMORE, MARYLAND, ASSIGNOR TO THE BLACK & DECKER MANUFACTURING COMPANY, OF TOWSON, MARYLAND, A CORPORATION OF MARYLAND.

ELECTRIC TOOL.

Application filed March 15, 1926. Serial No. 94,808.

The invention relates to electric tools and similar electric devices and particularly to the method of holding the stator or field in the motor casing or portion of the tool casing in which the motor is located. The invention is illustrated in connection with a portable power driven electric tool which may be either a drill, screw driver or wrench, valve grinder or tapper, all of which are made along somewhat similar lines with variations of the mechanism to adapt it to the particular purpose in hand. The invention has particular reference to the anchoring or holding of the field of a polyphase motor, but can be used to advantage with any kind of motor.

On account of the diameter and arrangement of the field the placing of bolts extending through the field parallel to the axis and seated in the casing is difficult or impossible without increasing the outside diameter of the tool, and such bolts have been found objectionable in view of the general use of aluminum casings in such tools because the stresses resulting from the regular operation of the tools are sufficient to break down the threads in the softer metal with the result that the screws loosen and in time the field drops on the fan with considerable resulting damage on account of the contact of the rapidly rotating fan with the field. The set screw method of holding the field is similarly objectionable.

The present invention relates to an improved method of anchoring or clamping the field in such tools so as to overcome these difficulties obviating the necessity for screws seated in the aluminum casing to hold the field and effecting a mounting of the field which is permanent, and which is economical not only on account of its permanency, but as to the cost of manufacture and the space which it occupies within the casing between the field and the walls of the casing. The anchoring means also has the advantage that it is seated flush with the casing requiring no protruding nuts or bolt heads.

More particularly the device of the invention in the preferred form comprises one or more shoulders on the inside of the casing presenting supporting surfaces which are engaged by the laminations or rings of the field and one or more hooks or keys, each having a threaded shank which extends into a hole in the casing and is adapted to be engaged by a nut which is affixed from outside the casing. The other end of the hook provides a shoulder adapted to engage the field, preferably the laminated portion on the side opposite to that engaged by the internal shoulder in the casing so that when the nut is tightened the field is drawn against its seat on the internal shoulders. The hooks or keys, as shown, fit in corresponding slots in the laminations of the field and one of the hook shanks is likewise seated in a slot in the casing acting as a key to prevent rotation of the field by the reaction of the motor torque. With the keys or hooks so arranged the field may fit the casing with a very slight clearance, giving the best economy of space.

In the accompanying drawings I have illustrated a motor stator or field anchor embodying my invention in the preferred form.

In the drawings:

Figure 1 is an elevation showing the general layout of a portable electric tool having the motor field anchored in accordance with the method and device of the invention.

Figure 2 is a section taken on a plane of the axis of the motor and showing the motor and field anchoring device and the portion of the tool casing which may be termed the motor casing.

Figure 3 is a section on the line 3—3 of Figure 2 looking in the direction of the arrows.

Figure 4 is an end elevation of the casing with the handle removed and looking from the right in Figure 2.

Referring to the drawings by numerals, each of which is used to indicate the same or similar parts in the different figures, the apparatus as shown comprises the tool casing 1, the portion of the casing immediately surrounding and enclosing the motor being referred to as the motor casing 2. Within this portion of the casing I have indicated a polyphase motor 3 having shaft 4 carrying laminated rotor 5, and a stator or field 6 comprising windings 7 and laminations in the form of plate rings 8. The laminated portion of the field is shown as of circular cross section and of a diameter to fit closely within the casing. In accordance with applicant's practice the field has a press fit in the casing and is positioned and supported by means of inwardly projecting shoulders or flanges 10, which as shown, extend inwardly so that the diameter of the casing measured from one shoulder to the other is possibly ⅛ to ¼ inch less than the extreme diameter of the stator, and the shoulders 11 preferably present toward the stator a flat surface 12 at right angles to the axis, there being preferably one shoulder near the center of each of the six sides of the casing or if the casing is other than hexagonal, these shoulders may be placed to suit the structure. There is also in the form shown a filler or shoulder 27 in the corner of the casing in which filler the keyway, to be described, is formed.

The motor is inserted from the left in Figure 2 and brought into contact with the shoulders 10 where it is held by tension members or keys shown in the form of hooks 11 and 25, each of these hooks or tension members has an abutment or offset at 14 at one end which takes over the laminations 8 at one side. As shown, said abutment is on the left side and the shank 15 of the tension member extends to the right into and, in the form shown, almost through the end of the casing at 16, the casing having an opening 17 to receive the end of each shank.

The opening is preferably enlarged or counter bored, as shown at 18, to receive a field anchor nut 19 engaging the end of the tension member, which in the preferred structure is correspondingly threaded for this purpose. The nut is placed in the counter bored opening flush with the casing.

The ends of the tension members are preferably cut short of the surface of the casing at 20 providing for the engagement of the nuts 19 by means of a suitable key referred to as a field nut key or a screw driver which enters the slots 21 therein.

In the form of the invention shown there are two of the tension members or hooks 11, 25, both of which are shown as passed through slots 22 in the outer cylindrical surface 24 of the field laminations. The slots and tension members are preferably parallel to the axis of the motor and rectangular, though exact compliance with these details is not essential to the successful operation of the device. One such key or tension member 25 projects into and also occupies a corresponding parallel and opposed slot 26 in the casing, the slot being located in a shoulder or filler 27, which in the form shown is formed in a corner of the casing at the intersection of two of the flat walls.

The manner of assembling will be understood from the description and drawings. The field or stator is first inserted into the casing from the left, the right hand plate or lamination being brought into contact with the shoulders 10. The nuts 17 having been removed the tension members or keys 11 and 25 are inserted from the left through and into the slots 22, one said key also occupying at the same time the slot 26 in the casing, which positions the stator and prevents absolutely any tendency to rotate as by the reaction of the torque imparted to the rotor. The tension members or keys having been placed, the nuts 20 are inserted in the counter bored holes 17 in the casing and engaged with the threads on the ends of the keys or tension members and tightened by means of a screw driver or the like, clamping the laminations of the stator between the shoulders or offsets 14 on the ends of the keys or tension members and the shoulders 10 in the casing.

This arrangement provides a positive lock against the rotary tendency of the field and makes it possible to use a casing of a relatively small diameter. It also obviates the necessity for seating the anchoring screws in the aluminum body of the casing, doing away with the consequent tendency to release and drop the field, the hook and nuts being conveniently made as hard as may be desired so that there is no question of the threads giving away on account of the stresses incident to operation or any stress which may be applied to the motor and further these stresses are deprived of their destructive effect by the positive locking of the field.

I have thus described specifically and in detail a single embodiment of my motor anchor in order that the nature and operation of the same may be clearly understood, however, the specific terms herein are used descriptively rather than in a limiting sense, the scope of the invention being defined in the claims.

What I claim and desire to secure by Letters Patent is:

1. The combination of a motor having a stator, a motor casing having an abutment engaging the stator from one side, a tension member substantially parallel to the motor axis and in the form of a key, the stator and casing having opposed grooves, the key extending into both said grooves locking the stator against rotation, and having an abutment engaging the stator oppositely to the engagement by said abutment on the casing and means for taking up on the key to grip the stator between said abutments.

2. The combination in an electric tool of a motor having a stator, a motor casing having a shoulder engaging the stator from one side, a tension member and a key, the stator and casing having opposed grooves, the key extending into both said grooves locking the stator against rotation, the tension member having an abutment engaging the stator oppositely to the engagement by said shoulder, and means for taking up on the tension member to grip the stator between the abutment and the tension member and the said shoulder on the casing, the casing having a depression admitting take up means to a position in which it is flush with the casing.

3. In an electric tool, a tool casing, a motor fitting inside the tool casing, the motor having a stator, the casing having a shoulder engaging the stator from one side, a tension member having an abutment engaging the stator from the other side, and means for taking up on the tension member to grip the stator between the abutment and the shoulder, the stator having a groove and the casing having an opposed groove and a key engaging both grooves.

Signed by me at Baltimore, Maryland, this 5th day of March, 1926.

WALTER STUMPF.